(12) United States Patent
Im et al.

(10) Patent No.: US 11,680,350 B2
(45) Date of Patent: Jun. 20, 2023

(54) WASHING MACHINE AND METHOD FOR CONTROLLING THE SAME

(71) Applicant: LG Electronics Inc., Seoul (KR)

(72) Inventors: Myunghun Im, Seoul (KR); Hwanjin Jung, Seoul (KR); Jaehyun Kim, Seoul (KR); Junghoon Lee, Seoul (KR); Kyungchul Woo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/551,466

(22) Filed: Dec. 15, 2021

(65) Prior Publication Data

US 2022/0106721 A1 Apr. 7, 2022

Related U.S. Application Data

(63) Continuation of application No. 16/240,401, filed on Jan. 4, 2019, now Pat. No. 11,220,774.

(30) Foreign Application Priority Data

Jan. 5, 2018 (KR) .................. 10-2018-0001835

(51) Int. Cl.
*D06F 33/00* (2020.01)
*D06F 33/34* (2020.01)
(Continued)

(52) U.S. Cl.
CPC .............. *D06F 33/46* (2020.02); *D06F 33/00* (2013.01); *D06F 33/34* (2020.02); *D06F 33/37* (2020.02);
(Continued)

(58) Field of Classification Search
None
See application file for complete search history.

(56) References Cited

U.S. PATENT DOCUMENTS

2004/0163427 A1 8/2004 Oh et al.
2016/0115635 A1 4/2016 Lee et al.

FOREIGN PATENT DOCUMENTS

DE 102009046782 6/2010
EP 2871278 5/2015
(Continued)

OTHER PUBLICATIONS

Extended European Search Report in European Application No. 19150325.9, dated Apr. 5, 2019, 12 pages.
(Continued)

*Primary Examiner* — Levon J Shahinian
(74) *Attorney, Agent, or Firm* — Fish & Richardson P.C.

(57) ABSTRACT

A method of controlling a washing machine. The washing machine includes a tub configured to receive water, a drum rotatably disposed in the tub, a volute pump including (i) an impeller configured to rotate in one or more directions to pump water discharged from the tub and (ii) a pump housing that defines a volute-shaped passage configured to guide water pumped by the impeller, and a circulating water supply device configured to supply water discharged from an outlet port of the volute pump into the drum. The method includes: supplying water and detergent into the tub; and rotating the impeller of the volute pump in a first direction to discharge a first amount of water from the volute pump, the first amount of water being less than a second amount of water discharged from the volute pump based on the impeller being rotated in a second direction.

12 Claims, 11 Drawing Sheets

(51) Int. Cl.
| | | |
|---|---|---|
| *D06F 33/37* | (2020.01) | |
| *D06F 33/46* | (2020.01) | |
| *D06F 37/14* | (2006.01) | |
| *D06F 39/02* | (2006.01) | |
| *D06F 39/08* | (2006.01) | |
| D06F 105/06 | (2020.01) | |
| D06F 105/48 | (2020.01) | |

(52) U.S. Cl.
CPC ............ *D06F 37/145* (2013.01); *D06F 39/02* (2013.01); *D06F 39/085* (2013.01); *D06F 2105/06* (2020.02); *D06F 2105/48* (2020.02)

(56) References Cited

FOREIGN PATENT DOCUMENTS

| | | |
|---|---|---|
| KR | 20130109354 | 10/2013 |
| KR | 20150121581 | 10/2015 |
| WO | WO2011046363 | 4/2011 |
| WO | WO2014013388 | 1/2014 |

OTHER PUBLICATIONS

Office Action in Korean Appln. No. 10-2018-0001835, dated Jan. 21, 2022, 16 pages (with English translation).

WASHING MACHINE AND METHOD FOR CONTROLLING THE SAME

CROSS-REFERENCE TO RELATED APPLICATION

This application is a continuation of U.S. application Ser. No. 16/240,401, filed on Jan. 4, 2019, which claims the benefit of an earlier filing date and right of priority to Korean Patent Application No. 10-2018-0001835, filed on Jan. 5, 2018 in the Korean Intellectual Property Office, the disclosures of which are incorporated herein by reference.

TECHNICAL FIELD

The present disclosure generally relates to a washing machine having a circulating pump, and a method for controlling the same.

BACKGROUND

A washing machine is a general term referring to an apparatus that separates contaminants from clothing, bed sheets, and so on (hereinafter, referred to as "laundry" using chemical decomposition and friction between water and detergent. The washing machine includes a cylindrical rotary drum which is installed in a tub for containing water, which has a plurality of through holes formed therein. If laundry is loaded into the drum and the washing machine is driven, water is supplied into the tub and/or the drum with detergent and the laundry is washed upon rotation of the drum.

In order to improve washing performance and prevent laundry detergent stains, the detergent needs to be dissolved with water. Conventionally, water is supplied with detergent in an initial washing stage to soak part of the drum in water and then the drum is rotated to stir water, thereby dissolving the detergent.

However, this method is possible only when water in the tub is at least at a level which is high enough to soak part of the drum, and thus, when a certain amount of detergent is supplied, concentration of wash water cannot exceed a certain value. Furthermore, some of water supplied with detergent (hereinafter, referred to wash water) is absorbed by laundry and thus the level of water in the tub is reduced. To compensate for the reduction in the water level, more water should be supplied and accordingly the concentration of the wash water is reduced further. As a result, laundry cannot be washed with high concentration wash water.

In addition, in this method, an area distal from the drum is less affected by rotation of the drum, and thus a water flow is not strong and detergent cannot be dissolved well. For example, detergent is not dissolved well in a drain bellows for guiding water drained from a tub toward a circulation pump or in a housing of the circulation pump.

Japanese Patent Application Publication No. 2010036016A (hereinafter, referred to as "Related Art 1") discloses a washing machine that circulates wash water using a circulation pump, to which a BLDC motor is applied, thereby spraying the wash water into the drum (or a water tank). In a normal operation, Related Art 1 rotates the circulation pump at 3500 rpm to apply circulating water to an area deep inside the drum at a high angle. When it is determined that an amount of laundry sensed by a load sensing means is less than a predetermined value, Related Art 1 rotates the circulation pump 2500 rpm to soak laundry positioned at the bottom of the drum at a low angle. Although Related Art 1 adjusts a speed of the circulation pump, circulating water is still sprayed into the drum and thus it is difficult to form high concentration wash water before applying water to laundry, as described above.

Japanese Patent Application Publication No. 2008113982A (Hereinafter, referred to as "Related Art 2") discloses a washing machine having a circulation pump capable of rotating forward and backward. The circulation pump has one impeller in a casing having two outlet ports, and one of the two outlet ports (hereinafter, referred to as a "first outlet port") is for dissolving detergent, and the other one thereof (hereinafter, referred to as a "second outlet port") is for supplying circulating water to a gasket nozzle. In the casing, there are formed a first partition wall for preventing water from being discharged through the second outlet port when the impeller rotates backward, and a second partition wall for preventing water from being discharged through the first outlet port when the impeller rotates forward.

Water discharged through the first outlet port (water mixed with detergent) by backward rotation of the impeller is transferred along a predetermined pipe and recovered into the tub again through an inlet hole formed at the bottom of the tub (or a water tank). That is, when the impeller rotates backward, water discharged from the tub circulates in a manner in which the water is pumped by the circulation pump and then introduced into the tub again. In particular, in this circulating course, the circulating water does not flow into the drum but reaches only a concave space provided in the lower side of the tub. Accordingly, it is possible to prevent undissolved detergent from being applied to laundry in the drum and form high-concentration wash water before applying the wash water to the laundry.

However, Related Art 2 requires not just a passage for spraying wash water into the drum, but also a circulation passage for dissolving detergent.

In addition, in Related Art 2, as the speed of backward rotation of the impeller is higher, the speed of water discharged through the first discharge port is higher, which reduces a circulation period of wash water. Accordingly, wash water cannot be agitated in the circulation pump by the impeller for an enough time in one circulation period.

SUMMARY

The first object of the present invention is to provide a washing machine capable of facilitating detergent dissolving using a volute pump of which a rotation direction is controllable, and a method for controlling the washing machine.

The second object of the present invention is to provide a washing machine which presents undissolved detergent from being applied to laundry so as to prevent contamination caused by solidification of detergent, and a method for controlling the washing machine.

The third object of the present invention is to provide a washing machine capable of selectively dissolving and circulating detergent according to a speed of the circulation pump, and a method for controlling the washing machine.

The fourth object of the present invention is to provide a washing machine which allows wash water to be agitated in the circulation pump for an enough time for one circulation period even when a rotation speed of the circulation pump is increased, and a method for controlling the washing machine.

The fifth object of the present invention is to provide a washing machine, which performs a detergent dissolving step using a nozzle configured to spray circulating water pumped by the circulation pump and prevents the sprayed circulating water from reaching the inside of the drum in the detergent dissolving step so as to prevent undissolved detergent from being applied to laundry, and a method for controlling the washing machine.

The present invention provides a method for controlling a washing machine which comprises: a drum rotatably provided in a tub for containing water; a volute pump having an impeller for pumping discharged from the tub and a pump housing with a volute-shaped passage formed therein, the passage along which the water pumped by the impeller is guided; and a circulating water supply device for supplying the water, discharged from an outlet port of the volute pump, into the drum, wherein the volute pump is capable of rotating the impeller in two directions, and wherein the volute pump discharges a larger amount of water when the impeller rotates in a forward direction than when the impeller rotates in a backward direction.

The method includes: a step (a) of supplying water into the tub with detergent; and a step (b) of rotating the volute pump in the backward direction.

The method may further include, after the step (b), a step (c) of rotating the volute pump in the forward direction.

The step (b) and the step (c) may be repeatedly performed multiple times.

A rotation speed of the volute pump in the step (b) may be higher than a rotation speed of the volute pump in the step (c).

While any one of the step (b) and the step (c) is performed, a step of rotating the drum such that laundry on an inner circumferential surface of the drum is lifted by a centrifugal force without falling from the inner circumferential surface, and braking the drum such that the laundry falls from the inner circumferential surface may be performed.

The braking of the drum may take place after the drum rotates a preset rotation angle being equal to or greater than 90 degrees and equal to less than 180 degrees from a stopped state.

The method may further include: after the step (C), a step of further supplying water into the tub after the step (c); and a step of rotating the drum in one direction one or more times such that laundry in the drum is lifted to a predetermined height and falls.

The present invention provides a washing machine including: a tub for containing water; a water supply valve for regulating a water supply pipe through which the water is supplied; a detergent box from which detergent is supplied into the tub with the water supplied through the water supply pipe; a drum rotatably provided in the tub; a volute pump configured to pump water discharged from the tub and rotate in two directions, wherein the volute pump discharges a larger amount of water when the impeller in a forward direction than when rotating in a backward direction; a circulating water supply device configured to spray the water, discharged from the outlet port, into the drum; and a processor configured to control the volute pump.

The processor may be further configured to open the water supply valve such that water is supplied to a predetermined water level in the tub, and control the volute pump such that the volute pump rotates in the backward direction.

The volute pump may include: an impeller configured to pump water; and a Brushless Direct Current (BLDC) motor configured to rotate the impeller.

The processor may be further configured to rotate the volute pump backward and then forward. The processor may be further configured to repeatedly perform multiple times an operation of rotating the volute pump in the backward direction and then in the forward direction.

The processor may be further configured to rotate the volute pump at a higher speed when the volute pump rotates in the backward direction than when the volute pump rotates in the forward direction.

First, according to the washing machine and a method for controlling the same of the present invention, when detergent is being dissolved. the volute pump rotates in the backward direction (a direction opposite to a direction in which a volute passage is rolled), and thus, even though the volute pump is rotated at a considerably high speed (if the volute pump rotates at this speed in the forward direction, circulating water sprayed through a nozzle is applied to laundry), circulating water may be discharged through the nozzle with low pressure (that is, pressure low enough not to allow the sprayed water to be applied to the laundry). Thus, detergent may be dissolved actively due to the considerable rotation speed of the volute pump, and undissolved detergent may not be applied to laundry.

Second, even when a small amount of water is supplied into a tub, detergent may be dissolved uniformly, thereby applying high concentration wash water to laundry and thus improving washing performance.

Third, even without adding an additional device for dissolving detergent, it is possible to uniformly dissolve detergent using the circulation pump.

Fourth, since detergent dissolved enough in water is applied to laundry, washing performance may improve.

Third, as undissolved detergent is prevented from being applied to laundry, it is possible to prevent laundry contamination caused by solidification of detergent.

Sixth, detergent may be uniformly dissolved even in a pump housing or a drain bellows.

Seventh, even though a speed of backward rotation of the circulation pump is increased, a small amount of water is discharged from the circulation pump and thus circulation water is able to be agitated in the circulation pump for an enough time for one circulation period. Accordingly, it is possible to quickly generate wash water in which detergent is uniformly dissolved.

Eighty, as the detergent dissolving step is performed through the nozzles formed in the gasket, an additional circulation passage for the detergent dissolving step is not required and thus a simple structure is achieved and the detergent dissolving step may be performed even in an existing washing machine.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Advantages and features of the present invention and methods for achieving them will be made clear from the embodiments described below in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is defined only by the scope of the claims. Like reference numerals refer to like elements throughout the specification.

Figure 1:
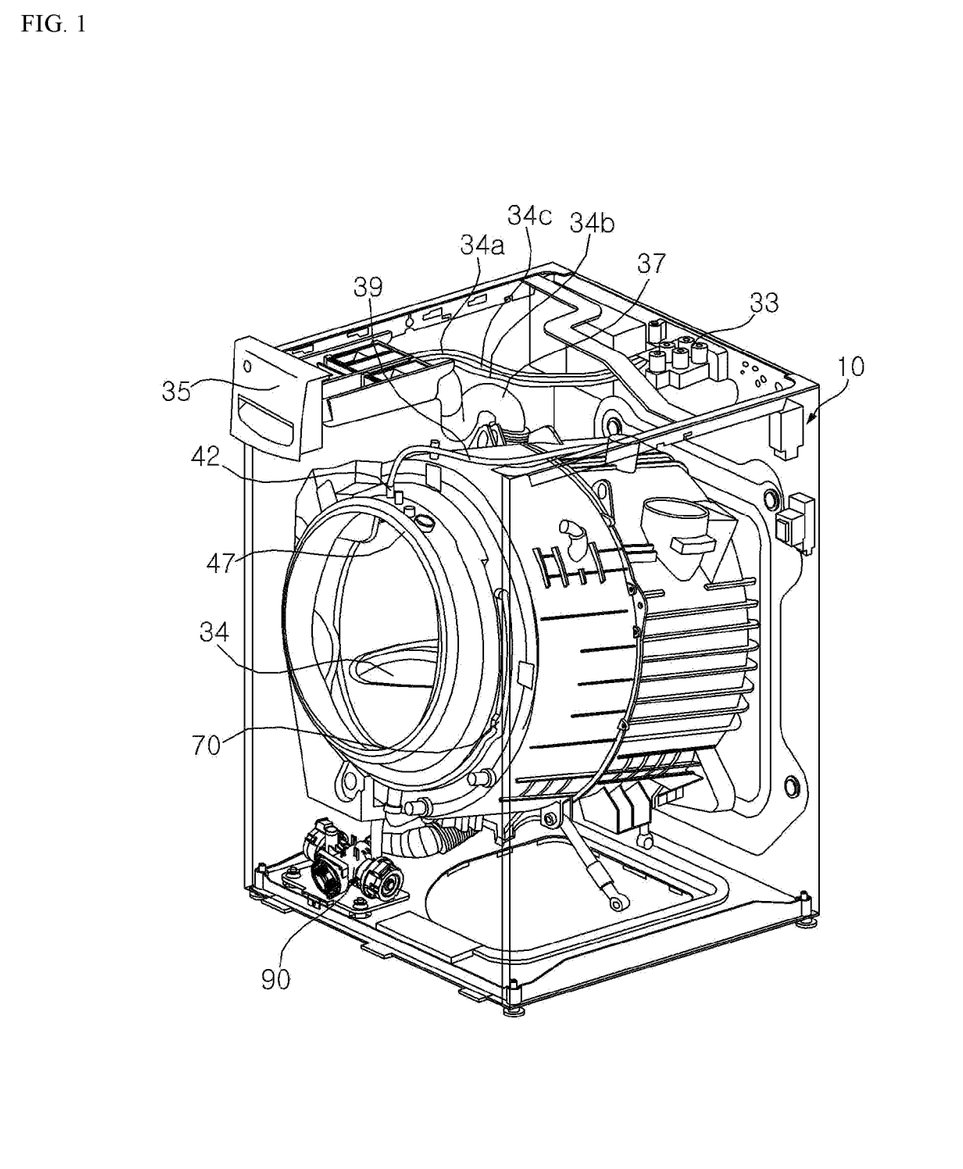
FIG. 1 is a perspective view illustrating a washing machine according to an embodiment of the present invention.
Figure 2:
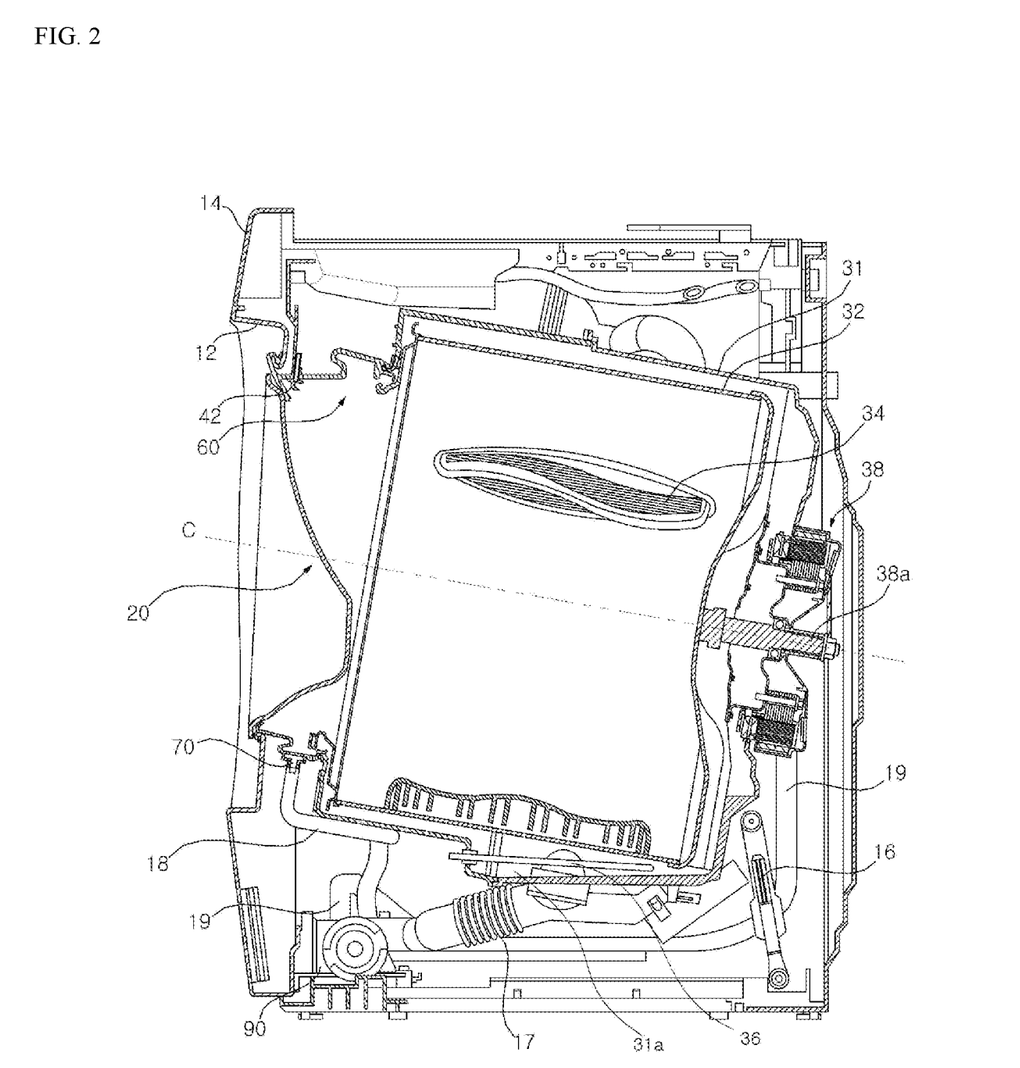
FIG. 2 is a lateral cross-sectional view of the washing machine shown in FIG. 1.
Figure 3:
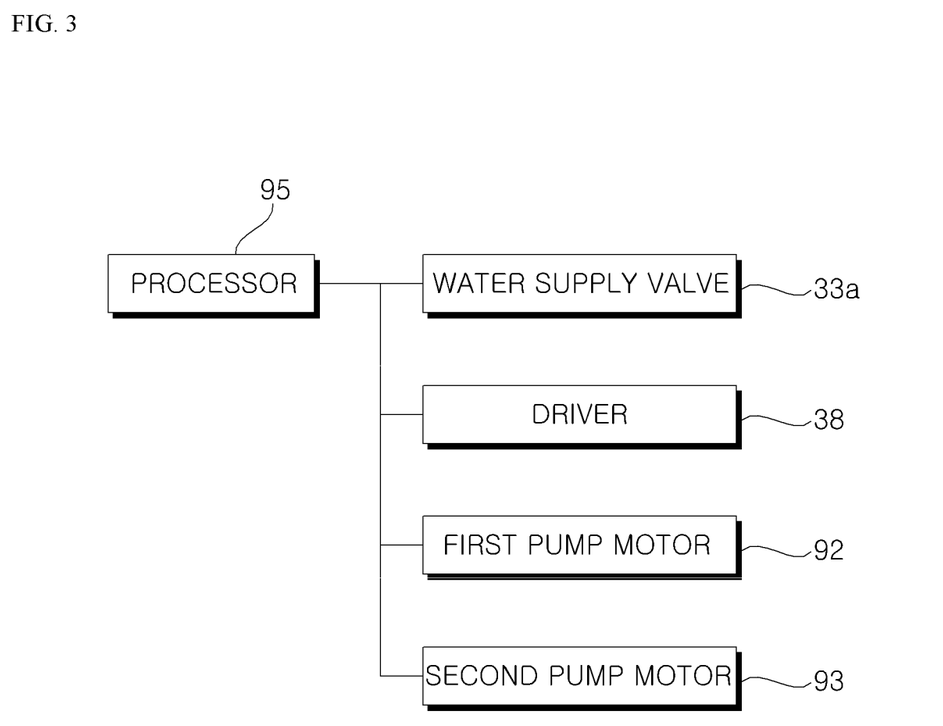
FIG. 3 is a block diagram illustrating a control relationship between major components of a washing machine according to an embodiment of the present invention.
Figure 4:
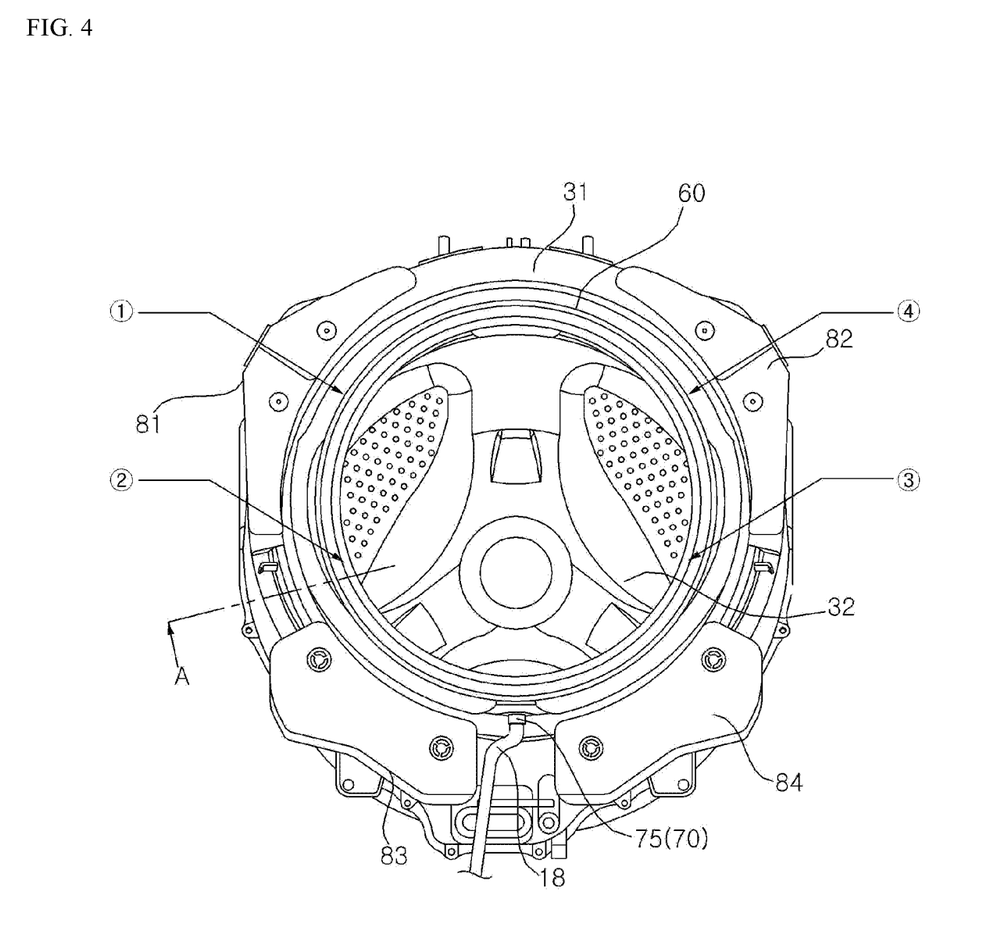
FIG. 4 is a front view of some of the components shown in FIG. 1.
Figure 5:
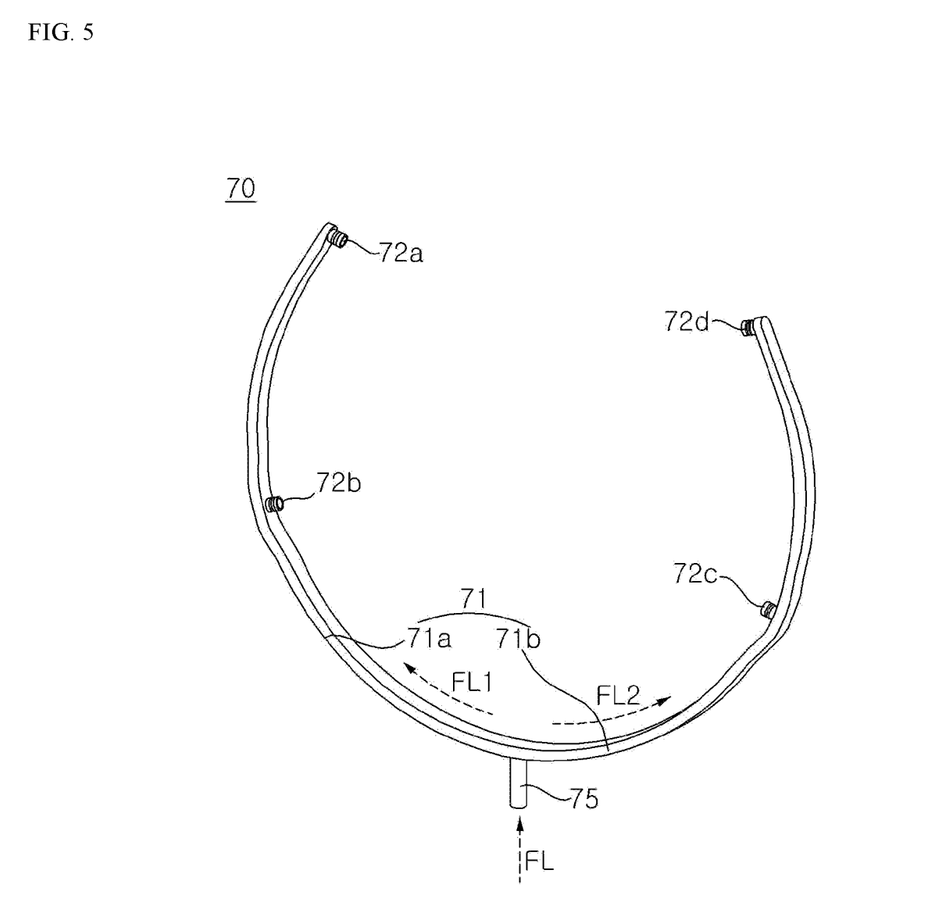
FIG. 5 is a perspective view of a circulation water supply device.
Figure 6:
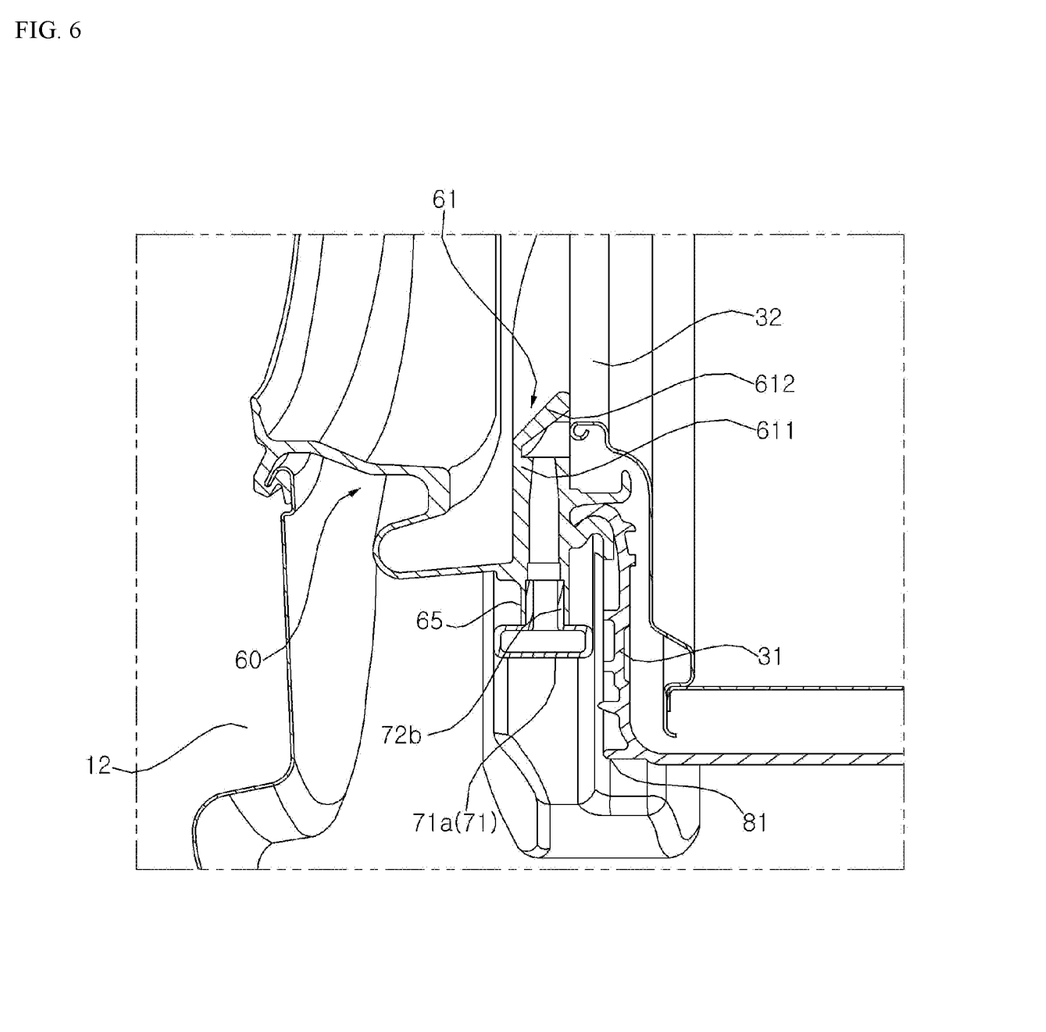
FIG. 6 is a cross-sectional view cut along line A shown in FIG. 4.

FIG. 1 is a perspective view illustrating a washing machine according to an embodiment of the present invention. FIG. 2 is a lateral cross-sectional view of the washing machine shown in FIG. 1. FIG. 3 is a block diagram illustrating a control relationship between major components of a washing machine according to an embodiment of the present invention. FIG. 4 is a front view of some of the components shown in FIG. 1. FIG. 5 is a perspective view of a circulation water supply device. FIG. 6 is a cross-sectional view cut along line A shown in FIG. 4.

Referring to FIGS. 1 to 6, a casing 10 forms an exterior appearance of a washing machine, and has an entry hole formed on a front surface, the entry hole through which laundry is loaded. A tub 31 for containing water may be disposed in the casing 10. FIG. 1 partially illustrates the casing 10, wherein a front surface and a top surface of the casing are omitted and only both side surfaces, a bottom surface, and a rear surface thereof are shown. In particular, the both side surfaces of the casing 10 are depicted transparent so that the inside of the casing 10 can be seen.

An entrance is formed on the front surface of the tub 31 to receive laundry. The casing 10 and the tub 31 are connected by a ring-shaped gasket 60 and formed such that a passage for entry and exit of laundry is formed in a section from the entry hole of the casing 10 to the entrance of the tub 31. A door 30 for opening and closing the entry hole may be rotatably coupled to a front panel 12 that forms the front surface of the casing 10.

A heater accommodation groove 31a is formed as being recessed at a position below the drum 32 on the inner circumferential surface of the tub 31. In the heater accommodation groove 31a, a heater 36 for heating water contained in the tub 31 may be disposed.

The gasket 60 is used to prevent a leakage of water contained in the tub 31. The gasket 60 is in a pipe shape such that a front end and a rear end of the gasket 60 are formed in a ring shape the front end extends to the rear end. The front end of the gasket 60 is fixed to the casing 10, and the rear end of the gasket 60 is fixed to the circumference of the entrance of the tub 31. The gasket 60 may be formed of a flexible or elastic material. The gasket 60 may be formed of natural rubber or synthetic resin.

Hereinafter, a portion defining the pipe-shaped inside of the gasket 60 is referred to as an inner circumferential portion (or an inner circumferential surface) of the gasket 60, and a portion opposite thereto is referred to as an outer circumferential portion (or an outer circumferential surface) of the gasket 60.

A drum 32 in which laundry is to be accommodated is rotatably provided in the tub 31. The drum 32 accommodates laundry, and the drum 32 is disposed such that the entry hole, through which the laundry is loaded, is placed on the front surface, and the drum 32 rotates around a rotation central line C which is approximately horizontal. In this case, "horizontal" does not refer to a mathematical definition thereof. That is, even in the case where the rotation central line C is inclined at a predetermined angle relative to a horizontal state, the rotation central line C may be considered substantially horizontal if the rotation central line C is more like in the horizontal state than in a vertical state. In order to allow water contained in the tub 31 to flow into the drum 32, a plurality of through hole 32h may be formed in the drum 32.

A plurality of lifters 34 may be provided on an inner surface of the drum 32. The plurality of lifters 34 may be arranged at a predetermined angle with respect to the center of the drum 32. Upon rotation of the drum 32, laundry repeatedly goes through an operation of being lifted by the plurality of lifters 34 and falling therefrom.

A driver 38 for rotating the drum 32 may be further provided, and a driving shaft 38a rotating by the driver 38 may penetrate the rear of the tub 31 and be coupled to the drum 32.

Preferably, the driver 38 may include a direct drive washing motor, and the washing motor may include a stator fixed to the rear of the tub 31 and a rotor rotating by a magnetic force occurring between the rotor and the stator. The driving shaft 38a may rotate integrally with the rotor.

The tub 31 may be supported by a damper 16 installed onto the base 15. Vibration of the tub 31 occurring upon rotation of the drum 32 is attenuated by the damper 16. Although not illustrated in the drawings, a hanger (e.g., a spring) by which the tub 31 is hung on the casing 10 may be further provided according to an embodiment.

In addition, there may be provided: at least one water supply hose for guiding water supplied from an external water source such as a water tap to the tub 31; and a water supply part 33 for controlling water supplied through the at least one water supply hose to be supplied to at least one water supply pipe 34a, 34b, and 34c which will be described later In addition, there may be provided a detergent box 35 for supplying additives, such as detergent and textile softener, into the tub 31 or the drum 32. The additives may be accommodated in the detergent box 35 separately by types thereof. The detergent box 35 may include a detergent accommodator for accommodating detergent, and a softener accommodator for accommodating textile softener.

There may be provided the at least one water supply pipe 34a, 34b, and 34c which selectively guides water supplied through the water supply part 33 to each accommodator of the detergent box 35. The water supply part 33 may include at least one water supply valve 94 (see FIG. 3) for regulating each of the at least one water supply pipe 34a, 34b, and 34c.

The at least one water supply pipe 34a, 34b, and 34c may include a first water supply pipe 34a for guiding cold water supplied through a cold water supply hose to the detergent accommodator, a second water supply pipe 34b for supplying cold water supplied through the cold water supply hose to the textile softener accommodator, and a third water supply pipe 34c for supplying hot water supplied through a hot water supply hose to the detergent accommodator.

Meanwhile, the gasket 50 may be provided with a direct water nozzle 42 for spraying water into the drum 32, and a direct water supply pipe 39 for guiding water supplied through the water supply part 33 to the direct water nozzle 42. The direct water nozzle 42 may be a swirl nozzle or a spray nozzle, but it is not necessarily limited thereto.

Water discharged from the detergent box 35 is supplied to the tub 31 through a water supply bellows 37. A water supply hole connected to the water supply bellows 37 may be formed on a side surface of the tub 31.

A drain hole for discharging water may be formed in the tub 31, and a drain bellows 17 may be connected to the drain hole. There may be provided a pump assembly 90 for pumping water discharged from the tub 31 through the drain bellows 17. In addition, a drain valve for regulating the drain bellows 17 may be further provided.

The pump assembly 90 may selectively perform a function of pumping water discharged through the drain bellows 17 to the drain pipe 19, and a function of pumping the water to the circulation pipe 18. Hereinafter, water pumped by the pump assembly 90 to be guided along the circulation pipe 18 will be referred to as circulating water. That is, the pump assembly 90 is a pump used to drain and circulate water, but it is not necessarily limited thereto. According to an embodiment, a drain pump and a circulation pump may be provided separately.

At least one balancer 81, 82, 83, and 84 may be provided around the circumference of the entrance of the tub 31 on the front surface of the tub 31. The at least one balancer 81, 82, 83, and 84 reduces vibration of the tub 31 is a weight body having a predetermined weight. The at least one balancer 81, 82, 83, and 84 may be provided as a plurality of balancers. A first upper balancer 81 and a second upper balancer 82 may be respectively provided on the left side and the right side in the upper part of the front surface of the tub 31, and a first lower balancer 83 and a second lower balancer 84 may be respectively provided on the left side and the right side in a lower part of the front surface of the tub 31.

The circulating water supply device 70 is used to supply water, introduced through the circulation pipe 18, into the drum 32. The circulating water supply device 70 may be installed at the gasket 60. The front end of the drum 32 (that is, the entrance of the drum 32) is at a location close to the entrance of the tub 31 (for example, the entrance of the drum 32 is located in the same plane as that of the tub entrance 31 or protrudes forward through the entrance of the tub 31). Furthermore, there are many structural reasons that do not allow spraying water into the drum 32 with a nozzle installed in the tub 31. For example, the entrance of the drum 32 may be positioned in the entrance of the tub 31 when viewed from a front side. Thus, it is preferable that at least one circulation nozzle 61 is formed in the gasket 60, which does not have a problem of spraying water into the drum 32, and that a circulating water supply device 70 for supplying water to the nozzle 61 is installed in the gasket 60.

The gasket 60 may include a plurality of nozzles 61 for spraying circulating water into the drum 32. The plurality of nozzles 61 may be formed on the inner circumferential portion of the gasket 60. Four nozzles 1 may be formed on the gasket 60. However, the number of the nozzles 61 is not necessarily limited thereto. In FIG. 4, ①, ②, ③, and ④ respectively indicate positions at which the nozzles 61 are formed.

The four nozzles 61 may be divided by height on the gasket 60 into upper nozzles (formed at positions ① and ④) and lower nozzles (formed at positions ② and ③) arranged at positions lower than the positions of the upper nozzles. These nozzles are different in terms of positions on the gasket 60, but have substantially identical structures.

Referring to FIG. 6, the nozzles 61 may include a nozzle inlet pipe 611 protruding inward from the extension part 63 of the gasket 60 along a radial direction, and a nozzle head 612 connected to the nozzle inlet pipe 611.

One end of the nozzle inlet pipe 611 connected to the extension part 63 has a port through hole formed therein, the other end of the nozzle inlet pipe 611 is connected to a corresponding nozzle 610.

The gasket 60 may further include a plurality of port insertion pipes 65 at positions respectively corresponding to the plurality of nozzle inlet pipes 611, the plurality of port insertion pipes 65 which protrude from an outer circumferential surface of the gasket 60. The port insertion pipes 65 communicate with nozzle inlet pipes 611 respectively corresponding thereto, and nozzle supply ports 72a, 72b, 72c, and 72d (see FIG. 5) are inserted into the port insertion pipes respectively corresponding thereto. Circulating water discharged from the nozzle water supply ports 72a, 72b, 72c, and 72d is supplied to the nozzle head 612 through the nozzle inlet pipe 611.

Referring to FIG. 5, the circulating water supply device 70 may include a circulation pipe connecting port 75 connected to the circulation pipe 18, a transfer pipe 71 guiding water introduced through the circulation pipe connecting port 75, and the plurality of nozzle water supply ports 72a, 72b, 72c, and 72d protruding from the transfer pipe 71.

The transfer pipe 71 separates circulating water FL introduced through the circulation water connecting port 75 to form a first water flow FL1 and a second water flow FL2. The transfer pipe 71 includes a first pipe 71a along which the first water flow FL1 is guided, and a second pipe 71b along which the second water flow FL2 is guided, and the upper ends of the first pipe 71a and the second pipe 71b are blocked.

One or more first nozzle water supply ports 72a and 72b are formed on the first pipe 71a such that circulating water is discharged through the one or more first nozzle water supply ports 72a and 72b to an upper nozzle 61a (a nozzle disposed at the position ①) and a lower nozzle (a nozzle 61 disposed at the position ②), which respectively correspond to the one or more first nozzle water supply ports 72a and 72b.

Likewise, one or more second nozzle water supply ports 72c and 72d are formed on the second pipe 71b such that circulating water is discharged through the one or more second nozzle water supply ports 72c and 72d to an upper nozzle (a nozzle 61 disposed at the position ④) and a lower nozzle (a nozzle 61 disposed at the position ③), which respectively correspond to the one or more second nozzle water supply ports 72c and 72d.

Figure 7:
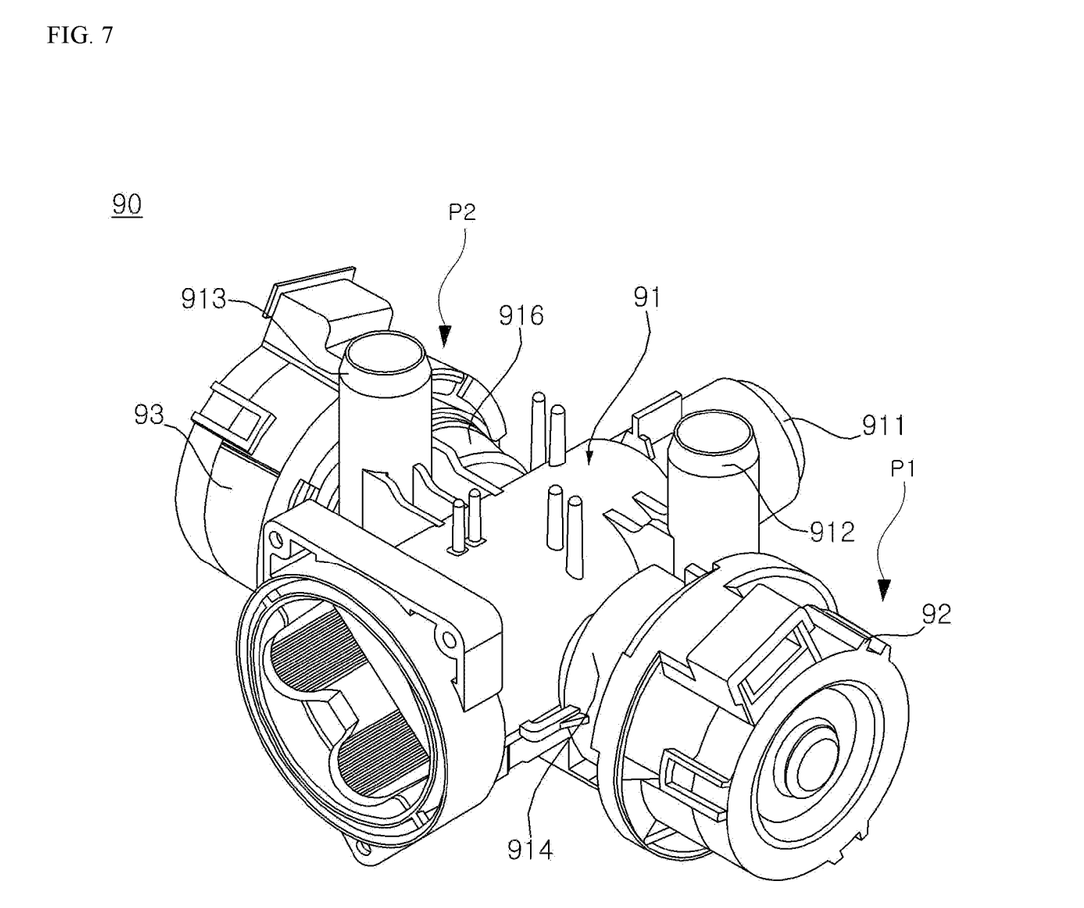
FIG. 7 is a perspective view of a pump assembly.
Figure 8:
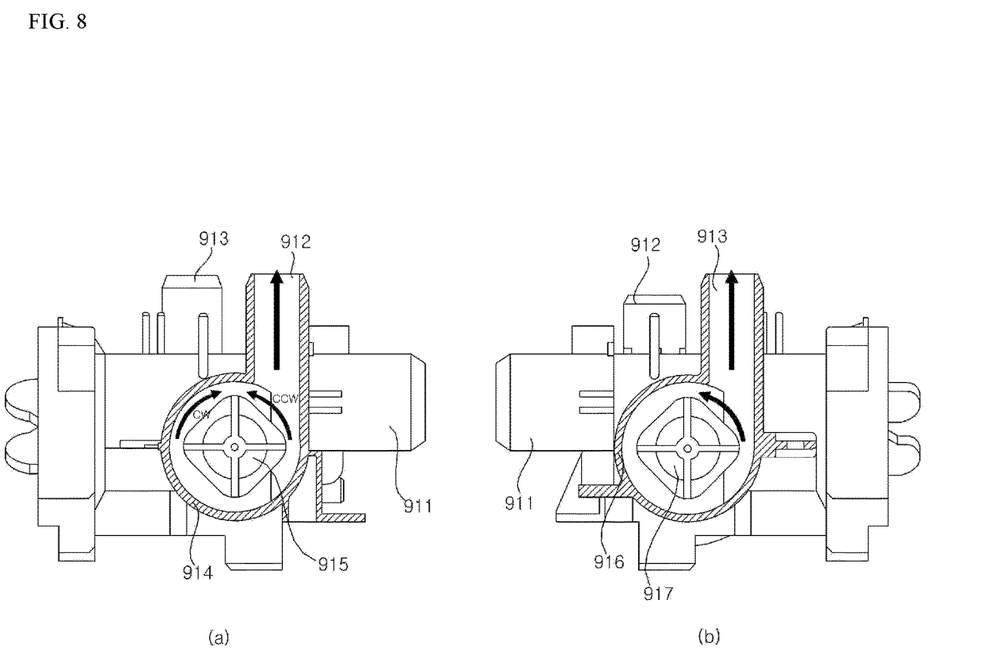
FIG. 8 illustrates a cross-sectional view (a) of a circulating water chamber of the pump assembly shown in FIG. 7, and a cross-sectional view (b) of a drain chamber of the pump assembly shown in FIG. 7.

FIG. 7 is a perspective view of a pump assembly. FIG. 8 illustrates a cross-sectional view (a) of a circulating water chamber of the pump assembly shown in FIG. 7, and a cross-sectional view (b) of a drain chamber of the pump assembly shown in FIG. 7.

The pump assembly 90 may include a pump housing 91, a first pump motor 92, a first impeller 915, a second pump motor 93, and a second impeller 917.

An inlet port 911, a first outlet port 912, and a second outlet port 913 may be formed in the pump housing 91. A first chamber 914 for accommodating the first impeller 915, and a second chamber 916 for accommodating the second impeller 917 may be formed in the housing 91. The first impeller 915 rotates by the first pump motor 92, and the second impeller 917 rotates by the second pump motor 93. Here, a rotation direction of each of the impellers 915 and 917 may be controlled by a processor 85.

The first chamber 914 and the first outlet port 912 form a volute-shaped passage rolled in a forward direction CCW of the first impeller 915, and the second chamber 916 and the second outlet port 913 form a volute-shaped passage rolled in a backward direction CW of the second impeller 917.

The first outlet port 912 extends from the first chamber 914 to be biased in a forward direction of the first impeller 915, and the second outlet port 913 extends from the second chamber 916 to be biased in a backward direction of the first impeller 915.

The inlet port 911 is connected to the drain bellows 17, and the first chamber 914 and the second chamber 916 communicate with the inlet port 911. Water discharged from the tub 31 through the drain bellows 17 is supplied to the first chamber 914 and the second chamber 916 through the inlet port 911.

The first chamber 914 communicates with the first outlet port 912, and the second chamber 916 communicates with the second outlet port 913. Thus, if the first pump motor 92 operates, the first impeller 915 rotates such that water contained in the first chamber 914 is discharged through the first outlet port 912. In addition, if the second pump motor operates, the second impeller 917 rotates such that water contained in the second chamber 916 is discharged through the second outlet port 913. The first outlet port 912 is connected to the circulation pipe 18 and the second outlet port 913 is connected to the drain pipe 19.

A flow rate (or a discharge pressure) of the pump assembly 90 is variable. To this end, pump motors 92 and 93 may be variable speed motor of which rotation speeds are variable. The pump motors 92 and 93 may be Brushless Direct Current (BLDC) motors, but they are not necessarily limited thereto. The pump motor s 92 and 93 may further include a driver for controlling a speed, and the driver may be an inverter driver. The inverter driver converts AC power into DC power, and inputs the DC power to a corresponding motor at a target frequency.

A processor 95 for controlling the pump motors 92 and 93 may be further provided. The processor 95 may include a Proportional-Integral (PI) controller, and Proportional-Integral-Derivative (PID) controller. The controller may receive an output value (for example, an output current) of a pump motor, and control an output value of the driver based on the received output value of the pump motor such that the number of rotations of the pump motor follows a preset target number of rotations.

The processor 95 may control not just a rotation speed, but also a rotation direction of the pump motors 92 and 93. In particular, an induction motor applied to an existing pump is not capable of controlling a rotation direction of the pump in operation, so, if the induction motor is used, it is difficult to control rotation of each impeller in a predetermined direction and this may cause an amount of water discharged from the outlet ports 912 and 913 to differ depending on a rotation direction of the impeller. However, the present invention is capable of controlling a rotation direction of the pump motors 92 and 93 in operation, thereby preventing the aforementioned problem and enabled to manage an amount of water discharged from the outlet ports 912 and 913 at a constant level.

Meanwhile, the pump assembly 90 serves as a circulation pump P1 and a drain pump P2. Hereinafter, the circulation pump P1 is defined as including the inlet port 911, the first chamber 914, the first outlet port 912, the first impeller 915, and the first pump motor 92, and the drain pump P2 is defined as including the inlet port 911, the second chamber 916, the second outlet port 913, the second impeller 917, and the second pump motor 93. The inlet port 911 is an element shared by the circulation pump P1 and the drain pump P2.

In addition, the circulation pump P1 is a volute pump having a volute-shaped passage which is formed as the first chamber 914 and the first outlet port 912 are rolled in the forward direction CCW of the first impeller 915, as described above. Likewise, the drain pump P2 is a volute pump as well.

Figure 9:
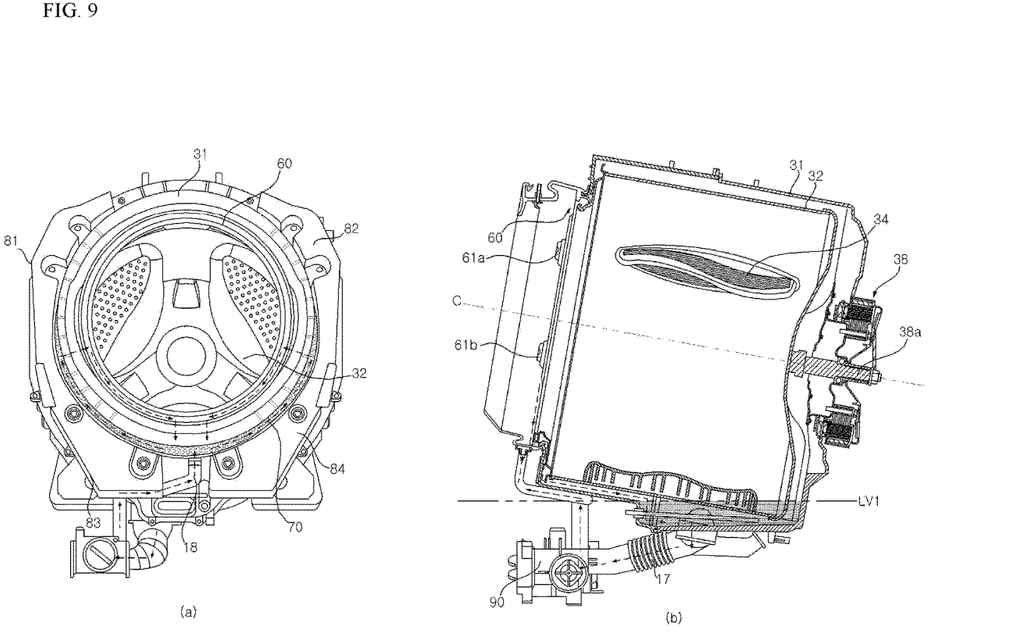
FIG. 9 illustrates circulation of water in a detergent dissolving step, wherein (a) illustrates circulation of water from a front side of a washing machine and (b) illustrates circulation of water from a side view of the washing machine.
Figure 10:
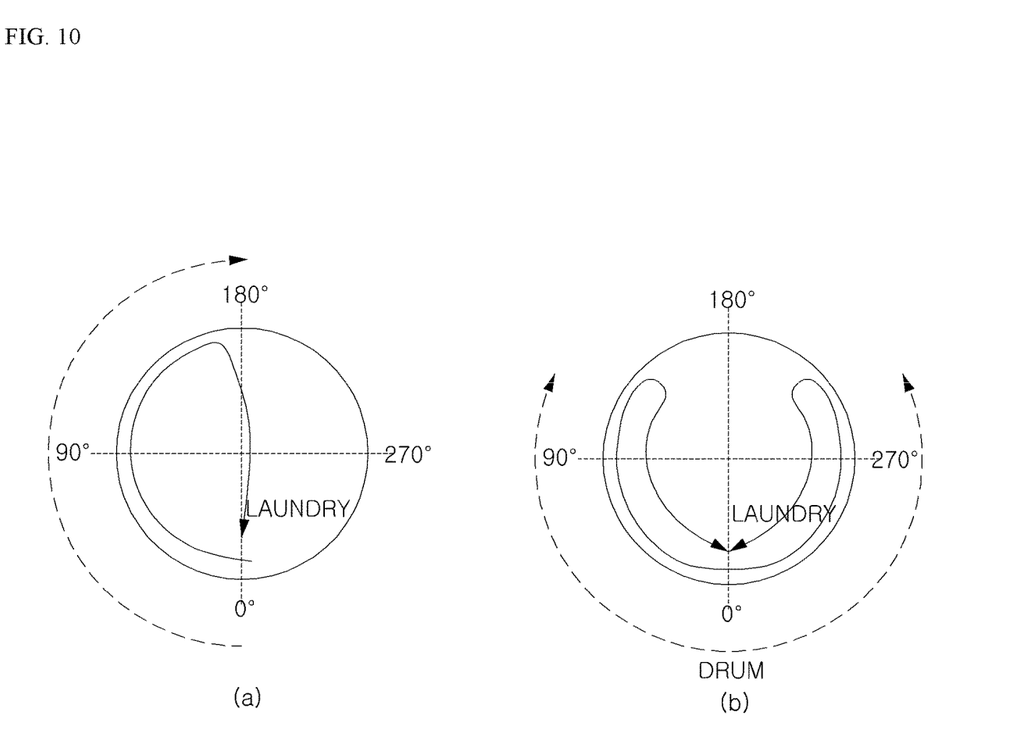
FIG. 10 illustrates a diagram (a) showing movement of laundry and rotation of a drum in a step motion, and a diagram (b) showing movement of the laundry and rotation of the drum in a scrub motion.
Figure 11:
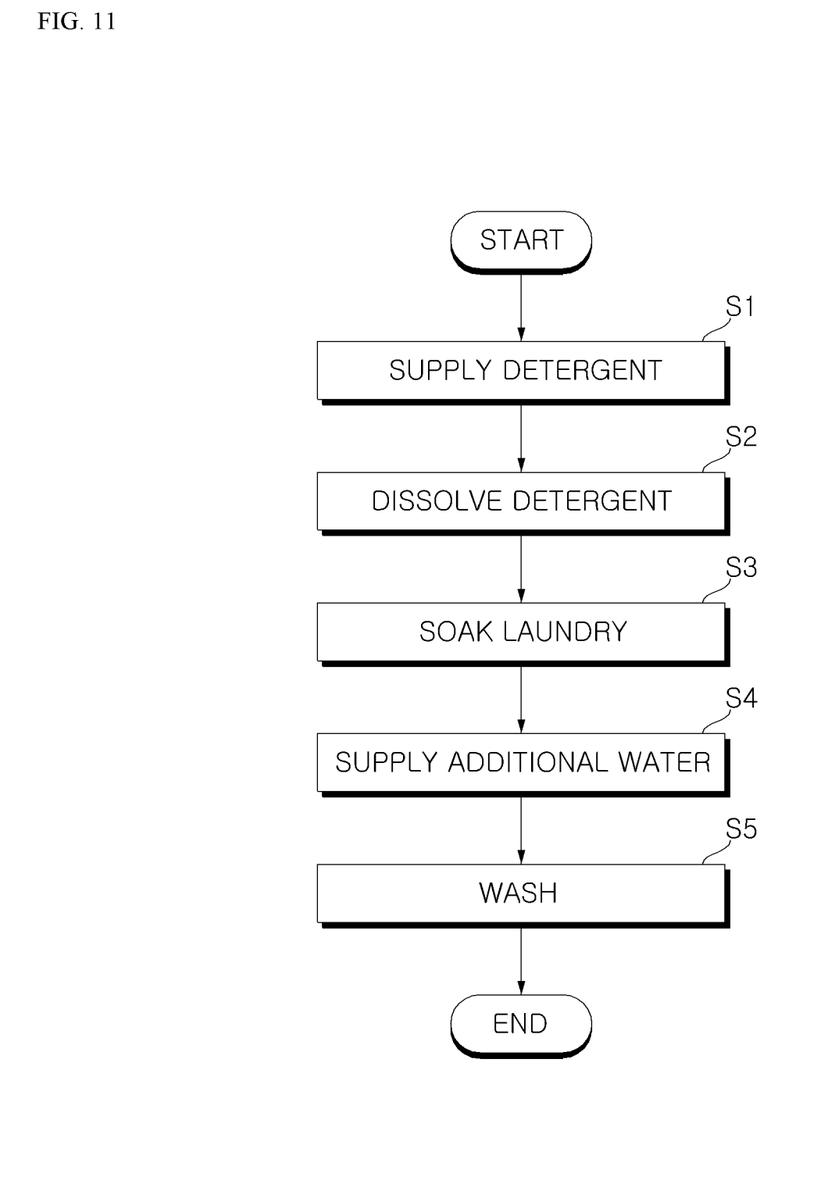
FIG. 11 is a flowchart illustrating a method for controlling a washing machine according to an embodiment of the present invention.

FIG. 9 illustrates circulation of water in a detergent dissolving step, wherein (a) illustrates circulation of water from a front view of a washing machine, and (b) illustrates circulation of water from a side view of the washing machine. FIG. 10 illustrates movement of laundry and rotation of a drum in a step motion (a) and movement of the laundry and rotation of the drum in a scrub motion (b). FIG. 11 is a flowchart illustrating a method for controlling a washing machine according to an embodiment of the present invention.

Referring to FIG. 11, a method for controlling a washing machine according to an embodiment of the present invention may be implemented in order of a detergent supplying step (S1), a detergent dissolving step (S2), a laundry soaking step (S3), an additional water supplying step (S4), and a washing step (S5).

The detergent supplying step (S1) is a step in which water having passed through the detergent box 35 is supplied into the tub 31 with detergent. The processor 95 controls the water supply valve 33a to be opened, and water supplied through the water supply pipes 34a, 34b, and 34c passes through the detergent box 35 and is then supplied into the tub 31 with detergent.

Water is supplied up to a preset first water level LV1. The first water level LV1 may be set such that a part of the drum 32 is filled with water. Preferably, as illustrated in FIG. 9, the first water level LV1 is set to a degree in which part of the drum 32 is soaked in water filled in the heater accommodation groove 31a.

However, aspects of the present invention are not limited thereto, and the first water level LV1 may be set within a range in which any part of the drum 32 is not soaked in water filled in the heater accommodation groove 31a.

The detergent dissolving step (S2) is a step of uniformly dissolving detergent introduced into the tub 31. In the detergent dissolving step (S2), the circulation pump P1 rotates.

Specifically, the circulation pump P1 may rotate in the backward CW in the detergent dissolving step (S2). Circulating water is discharged through the first outlet port 912, but an amount of water discharged through the first outlet port 912 is less than an amount of water discharged when the circulation pump P1 rotates at the same speed in the forward direction CCW.

A speed of the circulation pump P1 rotating in the backward direction CW may be set within a range in which circulating water is not allowed to be sprayed through a nozzle 61. That is, water is not sprayed through the nozzle 61, but the circulating water is agitated by rotation of the first impeller 915, thereby facilitating dissolving of detergent.

Alternatively, as illustrated in FIG. 9, circulating water is sprayed through at least one nozzle 61, but a sprayed water stream fails to reach deep inside the drum 32 and instead falls from about an exit hole of the at least one nozzle 61 such that the fallen water flows down the front part of the drum 32 in which the gasket 60 or the entrance of the drum 32 is formed. In this case, it is preferable that the circulating water is discharged only from lower nozzles (the nozzles 61 disposed at positions ② and ③) among the plurality of nozzles and circulating water flowing along the transfer pipe 71 does not reach higher nozzles (the nozzles disposed at positions ① and ④). Since circulating water sprayed from the at least one nozzle 61 is not applied directly to wash water, incompletely dissolved detergent is not deposited on laundry.

As such, after the circulation pump P1 rotates in the backward direction, the processor 95 may control the circulation pump P1 to rotate in the forward direction CCW. With the change of the rotation direction of the circulation pump P1, dissolving of detergent may be facilitated. The forward rotation and the backward rotation of the circulation pump P1 may be repeated multiple times.

Meanwhile, in the detergent dissolving step (S2), the rotation of the circulation pump P1 in the backward direction CW may be performed at a speed higher than a speed at which the circulation pump P1 rotates in the forward CCW. For example, the circulation pump P1 may rotate at about 1100 rpm in the forward direction CCW, and rotate at about 1300 rpm in the backward direction CW. Regardless of which one of the forward direction CCW or the backward direction CW the circulation pump P1 may rotate in the detergent dissolving step (S2), it is preferable that water sprayed through the at least one nozzle is not allowed to reach the drum. That is, the water sprayed from the at least one nozzle 61 flows down the inner circumferential surface of the gasket 60 and reaches the tub 31 through a space between the tub 31 and the drum 32. Detergent left undissolved in the detergent dissolving step (S2) is prevented from being applied to laundry.

While the circulation pump P1 rotates in the detergent dissolving step (S2), the drum 32 may rotate. In this case, the drum 32 rotates at a speed at which laundry on the inner circumferential surface of the drum 32 (that is, laundry positioned in the lowest side in the stopped state of the drum 32) is lifted by a centrifugal force rather than falling from the inner circumferential surface of the drum 32, and the rotation of the drum 32 is stopped when the drum 32 is braked to make the laundry fall from the inner circumferential surface of the drum 32.

The braking of the drum 32 may take place when the drum 32 in the stopped state rotates by a predetermined rotation angle set being equal to or greater than 90 degrees and equal to or less than 180 degrees. Controlling rotation of the drum 32 in the above manner may be performed in the step motion and the scrub motion.

In the step motion, rotation of the drum 32 and movement of laundry occurs in the manner illustrated in (a) of FIG. 10. The step motion is a motion of rotating the drum 32 at a speed at which laundry does not fall from the inner circumferential surface of the drum 32 due to a centrifugal force (that is, a speed at which the laundry rotates along with the drum 32 due to the centrifugal force while stuck to the inner circumferential surface of the drum 32) and then braking the drum 32, thereby maximizing impact to the laundry.

For example, if the washing motor rotates the drum 32 at about 60 rpm or more, laundry rotates by a centrifugal force without falling (that is, the laundry rotates along with the drum 32 while stuck to the inner circumferential surface of the drum 32). In this course, if the laundry is positioned at about the highest point (at 180 degrees in a rotation direction) of the drum 32, a torque in a direction opposite to the rotation direction of the drum 32 may be controlled to be applied to the washing motor.

The laundry is lifted in the rotation direction from a lowest point in the drum 32 and falls toward a lowest point in the drum 32 upon stopping of the drum 32. Accordingly, the laundry falls with a maximum head and thus a maximum impact is applied to the laundry.

The step motion appears such that, when the drum 32 rotates in the clockwise direction, laundry positioned at a lowest point in the drum 32 moves to the highest point (at 180 degrees) of the drum 32 after passing a third quadrant and a second quadrant (out of first, second, third, and fourth quadrants which are of the drum 32 divided, when viewed from the front side, by X and Y axes crossing the center of the drum 32 and being orthogonal to each other, and which are defined in the clockwise direction according to general definition of quadrant) and is then separated from the inner circumferential surface of the drum 32, falling toward a lowest point in the drum 32. Accordingly, the step motion triggers the greatest head of laundry, and, if the amount of the laundry is smaller, the step motion produces a mechanical force more efficiently.

In the scrub motion, rotation of the drum and movement of laundry occurs in the manner illustrated in (b) of FIG. 10. The scrub motion is a motion in which the washing motor rotates the drum 32 in two directions alternately and controls laundry to fall from a point at about 90 degrees or more in a rotation direction of the drum 32.

For example, if the washing motor rotates the drum 32 in the forward direction at 60 rpm or more, laundry positioned at a lowest point in the drum 32 is lifted by a predetermined height in the forward direction. In this case, if the laundry reaches a point corresponding to a set angle equal to or greater than about 90 degrees in the forward direction (preferably but not necessarily limited to an angle of 139 to 150 degrees, and possibly an angle of 150 degrees or more), the washing motor applies a reverse torque to the drum, thereby temporarily stopping the rotation of the drum 32. Then, laundry on the inner circumferential surface of the drum 32 falls swiftly.

Then, the washing motor rotates the drum 32 in the backward direction at about 60 rpm, thereby lifting the fallen laundry to a predetermined height at 90 degrees or more in the backward direction. In this case, if the laundry reaches to a point corresponding to a set angle equal to or greater than 90 degrees (for example, an angle of 139 to 150 degrees) in the backward direction, the washing motor applies a reverse torque to the drum 32 again, thereby temporarily stopping the rotation of the drum 32. In this case, laundry on the inner circumferential surface of the drum 32 falls toward a lowest point in the drum 32 from a point at about 90 degrees or more in the backward direction.

The laundry soaking step (S3) is a step of spraying circulating water through at least one nozzle 61 with detergent uniformly dissolved in the detergent dissolving step (S2) to be applied to laundry. The circulation pump P1 rotates in the forward direction at a speed higher than in the detergent dissolving step (S2) such that wash water sprayed from the at least one nozzle 61 reaches even laundry in the drum 32. In the laundry soaking step (S3), the drum 32 may rotate to mix laundry items in the drum 32 properly.

After the laundry soaking step (S3), an additional water supplying step (S4) may be performed. The water supply valve 33a is opened again to further supply water into the tub 31 to a second water level. Accordingly, an amount of water sufficient for washing laundry is secured, and detergent is further diluted.

After the additional water supplying step (S4), a washing step (S5) may be performed. In the washing step (S5), the drum 32 rotates. In this case, the drum 32 may perform one or more rotations continuously such that laundry in the drum 32 is lifted to a predetermined height and falls therefrom.

What is claimed is:

1. A washing machine comprising:
   a tub;
   a water supply valve configured to regulate a water supply pipe, the water supply pipe being configured to supply water;
   a detergent box that is configured to accommodate an additive and that is connected to the water supply pipe and the tub;
   a drum rotatably disposed in the tub;
   a circulation pump connected to the tub and configured to pump water discharged from the tub, the circulation pump comprising:
      a first impeller,
      a first pump motor configured to rotate the first impeller in a first direction or a second direction that is opposite to the first direction,
      a chamber that accommodates the first impeller, and
      an outlet port that extends from the chamber and that is inclined in the first direction with respect to a radial direction of the first impeller, the outlet port being configured to discharge water from the chamber;
   a circulating water supply device configured to receive water discharged from the outlet port and configured to guide water discharged from the outlet port into the drum; and
   a processor configured to:
      open the water supply valve to supply water mixed with the additive to the tub,
      based on opening of the water supply valve, control the first impeller to rotate in the second direction, and
      based on rotation of the first impeller in the second direction, control the first impeller to rotate in the first direction to supply the water mixed with the additive to the circulating water supply device.

2. The washing machine of claim 1, wherein the processor is configured to rotate the first impeller in the second direction without spraying the water mixed with the additive into the tub.

3. The washing machine of claim 1, wherein the processor is configured to:
   rotate the first impeller in the first direction at a first speed, and
   rotate the first impeller in the second direction at a second speed that is greater than the first speed without spraying the water mixed with the additive into the drum.

4. The washing machine of claim 1, wherein the processor is configured to repeatedly perform an operation comprising rotating the first impeller in the second direction and subsequently rotating the first impeller in the first direction.

5. The washing machine of claim 1, further comprising a drain pump connected to the tub and configured to drain water discharged from the tub to an outside of the washing machine,
   wherein the drain pump comprises a second impeller and a second pump motor configured to rotate the second impeller.

6. The washing machine of claim 1, wherein the circulating water supply device comprises:
   a nozzle configured to spray water into the tub; and
   a circulation pipe that connects the outlet port and the nozzle.

7. The washing machine of claim 1, wherein the circulation pump is configured to:
   based on the first impeller rotating in the second direction, mix water with the additive within the chamber; and
   based on the first impeller rotating in the first direction, discharge the water mixed with the additive to the outlet port.

8. The washing machine of claim 1, wherein a second amount of water discharged through the outlet port while the first impeller rotates at a predetermined speed in the second direction is less than a first amount of water discharged through the outlet port while the first impeller rotates at the predetermined speed in the first direction.

9. The washing machine of claim 8, wherein the second amount of water discharged through the outlet port while the first impeller rotates in the second direction is less than a threshold amount for spraying water to the tub through the circulating water supply device.

10. The washing machine of claim 1, wherein the chamber defines a passage that is rolled in the first direction and that surrounds a circumference of the first impeller.

11. The washing machine of claim 1, wherein the tub has an entrance hole defined at a front surface of the tub, and
   wherein the washing machine further comprises:
      a casing having an entry hole defined at a front surface of the casing, the tub being disposed inside the casing;
      a circulation pipe that connects the outlet port to the circulating water supply device; and
      a gasket that has a ring shape and that connects the entry hole of the casing to the entrance hole of the tub, the gasket comprising:
         a port insertion pipe connected to the circulating water supply device, and
         a nozzle disposed at an inner circumferential portion of the gasket and configured to spray water into the drum.

12. The washing machine of claim 1, wherein the first direction is a counterclockwise direction, and the second direction is a clockwise direction.

* * * * *